US011942318B2

(12) United States Patent
Shchepunov

(10) Patent No.: US 11,942,318 B2
(45) Date of Patent: Mar. 26, 2024

(54) MASS ANALYZER WITH 3D ELECTROSTATIC FIELD

(71) Applicant: SHIMADZU CORPORATION, Kyoto (JP)

(72) Inventor: Vyacheslav Shchepunov, Manchester (GB)

(73) Assignee: SHIMADZU CORPORATION, Kyoto (JP)

( * ) Notice: Subject to any disclaimer, the term of this patent is extended or adjusted under 35 U.S.C. 154(b) by 446 days.

(21) Appl. No.: 16/919,460

(22) Filed: Jul. 2, 2020

(65) Prior Publication Data

US 2021/0020421 A1 Jan. 21, 2021

(30) Foreign Application Priority Data

Jul. 19, 2019 (GB) ..................................... 1910337

(51) Int. Cl.

| | |
|---|---|
| ***H01J 49/42*** | (2006.01) |
| ***H01J 49/06*** | (2006.01) |
| ***H01J 49/40*** | (2006.01) |

(52) U.S. Cl.

CPC ........ *H01J 49/4245* (2013.01); *H01J 49/061* (2013.01); *H01J 49/062* (2013.01); (Continued)

(58) Field of Classification Search

None

See application file for complete search history.

(56) References Cited

U.S. PATENT DOCUMENTS 6,037,586 A 3/2000 Baril
7,504,620 B2 3/2009 Sato et al.
(Continued)

FOREIGN PATENT DOCUMENTS

CN 1853255 A 10/2006
CN 101171660 A 4/2008
(Continued)

OTHER PUBLICATIONS

Search Report for British Application No. GB1910337.3, dated Jan. 10, 2020.

(Continued)

*Primary Examiner* — James Choi

(74) *Attorney, Agent, or Firm* — Sughrue Mion, PLLC

(57) ABSTRACT

A mass analyser for use in a mass spectrometer, the mass analyser having: a set of sector electrodes spatially arranged to provide an electrostatic field in a 2D reference plane suitable for guiding ions along an orbit in the 2D reference plane, wherein the set of sector electrodes extend along a drift path that is locally orthogonal to the reference plane so that, in use, the set of sector electrodes provide a 3D electrostatic field region; and an injection interface configured to inject ions into the mass analyser via an injection opening such that the ions injected into the mass analyser are guided by the 3D electrostatic field region along a 3D reference trajectory according to which ions perform multiple turns within the mass analyser whilst drifting along the drift path, wherein each turn corresponds to a completed orbit in the 2D reference plane. The injection interface includes at least one injection deflector located within the mass analyser, the at least one injection deflector being configured to deflect ions injected into the mass analyser in the direction of the drift path, wherein the injection interface is preferably configured so that ions guided along the 3D reference trajectory are, after injection into the mass analyser, kept adequately distant from the injection opening such that they are substantially unaffected by electric field distortions around the injection opening.

17 Claims, 12 Drawing Sheets

(52) U.S. Cl.
CPC .......... *H01J 49/401* (2013.01); *H01J 49/403* (2013.01); *H01J 49/408* (2013.01)

(56) References Cited

U.S. PATENT DOCUMENTS

| | | | | |
|---|---|---|---|---|
| 9,082,602 | B2 | 7/2015 | Shchepunov et al. | |
| 2006/0214100 | A1* | 9/2006 | Verentchikov ........ | H01J 49/406 250/287 |
| 2014/0291503 | A1* | 10/2014 | Shchepunov ......... | H01J 49/062 250/282 |
| 2020/0168448 | A1* | 5/2020 | Verenchikov ......... | H01J 49/061 |

FOREIGN PATENT DOCUMENTS

| | | | |
|---|---|---|---|
| CN | 102939638 | A | 2/2013 |
| CN | 106461621 | A | 2/2017 |
| EP | 2858090 | A1 | 4/2015 |
| JP | 2010-506349 | A | 2/2010 |
| JP | 2014-501439 | A | 1/2014 |
| JP | 2014-531119 | A | 11/2014 |
| WO | 2005/001878 | A3 | 1/2005 |
| WO | 2006/102430 | A3 | 9/2006 |
| WO | 2008/047891 | A2 | 4/2008 |
| WO | 2008/139506 | A1 | 11/2008 |
| WO | 2011/086430 | A1 | 7/2011 |
| WO | 2011/107836 | A1 | 9/2011 |
| WO | 2012/081826 | A1 | 6/2012 |
| WO | 2012/092457 | A1 | 7/2012 |
| WO | 2012/116765 | A1 | 9/2012 |
| WO | 2013/057505 | A2 | 4/2013 |
| WO | 2015/153644 | A1 | 10/2015 |
| WO | 2018/033494 | A1 | 2/2018 |

OTHER PUBLICATIONS

V. Shchepunov et al, "A High Resolution Multi-turn TOF Mass Analyser", Shimadzu Review, pp. 141-147, 2015, vol. 72, No. 3 and 4.

* cited by examiner

Fig. 11A(ii)

Fig. 11A(iii)

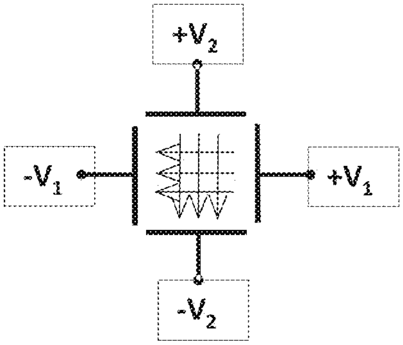
Fig. 12A(i)
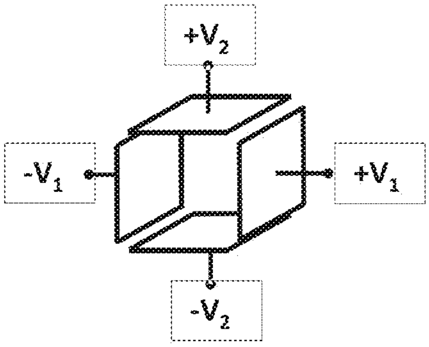
Fig. 12A(ii)
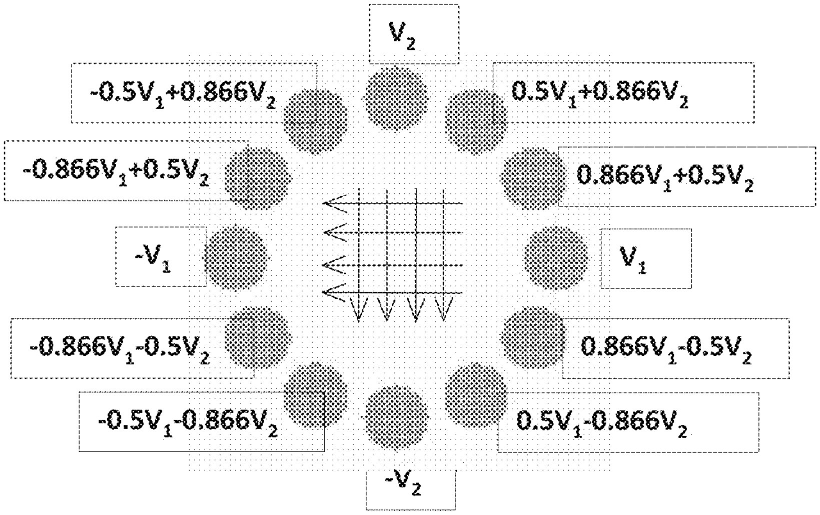
Fig. 12B
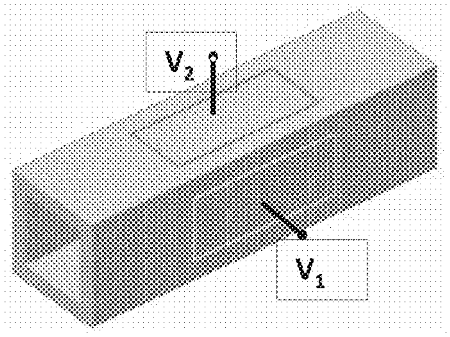
Fig. 12C(i)
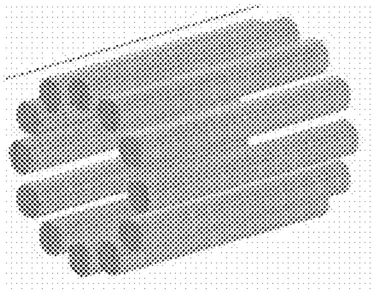
Fig. 12C(ii)

MASS ANALYZER WITH 3D ELECTROSTATIC FIELD

CROSS-REFERENCE TO RELATED APPLICATIONS

This application claims priority from GB 1910337.3, filed Jul. 19, 2019, the entire contents of which are herein incorporated by reference.

FIELD OF THE INVENTION

The present invention relates to a mass analyser.

BACKGROUND

It is known to have a mass analyser that includes:

a set of sector electrodes spatially arranged to provide an electrostatic field in a 2D reference plane suitable for guiding ions along an orbit in the 2D reference plane, wherein the set of sector electrodes extend along a drift path that is locally orthogonal to the reference plane so that, in use, the set of sector electrodes provide a 3D electrostatic field region; and an injection interface configured to inject ions into the mass analyser via an injection opening such that the ions injected into the mass analyser are guided by the 3D electrostatic field region along a 3D reference trajectory according to which ions perform multiple turns within the mass analyser whilst drifting along the drift path, wherein each turn corresponds to a completed orbit in the 2D reference plane.

Such a mass analyser is disclosed in U.S. Pat. No. 9,082,602B2 (see e.g. FIG. 4, noting that here the drift path curves around a reference axis included in the reference plane), "A High Resolution Multi-turn TOF Mass Analyser", V. Shchepunov et al, SHIMADZU REVIEW, Vol. 72, No. 3.4 (2015) (see e.g. FIG. 6, noting that here the drift path is curved), U.S. Pat. No. 7,504,620B2 (see e.g. FIG. 5, noting that here the drift path is linear), WO2011/086430A1 (see e.g. FIG. 11, noting that here the drift path is linear), and also in WO2018/033494A1 (see e.g. FIG. 6, noting that here the drift path is linear).

U.S. Pat. No. 9,082,602B2 suggests (see FIG. 15A, 15C, 15D; col. 26 line 60-col. 27 page 36; col. 33 lines 31-46) using a "fringe field corrector" in the form of a set of wire tracks on a printed circuit board ("PCB") to compensate electric field distortions caused by openings in the main sector electrodes which are present to allow ions to be injected into and extracted out from the mass analyser (these openings may also be referred to as the "injection aperture" and the "extraction aperture"). However, in smaller size mass analysers or in mass analysers operating at higher density of turns in the direction of the drift path, some or all of the ions may pass too close to the surface of the PCB fringe field corrector at which locations the electric fields may be distorted. At injection, such a distortion may deteriorate beam timing properties and reduce mass resolution as well as the analyser transmission efficiency. Extraction efficiency may also be reduced due to additional losses at the extraction opening caused by influence of both injection and extraction PCB fringe field correctors. Also, imperfect alignment and/or fabrication accuracy of the PCB correctors may result in similar reduction of transmission and resolution.

The present invention has been devised in light of the above considerations.

SUMMARY OF THE INVENTION

A first aspect of the invention provides:

A mass analyser for use in a mass spectrometer, the mass analyser having:

a set of sector electrodes spatially arranged to provide an electrostatic field in a 2D reference plane suitable for guiding ions along an orbit in the 2D reference plane, wherein the set of sector electrodes extend along a drift path that is locally orthogonal to the reference plane so that, in use, the set of sector electrodes provide a 3D electrostatic field region; and an injection interface configured to inject ions into the mass analyser via an injection opening such that the ions injected into the mass analyser are guided by the 3D electrostatic field region along a 3D reference trajectory according to which ions perform multiple turns within the mass analyser whilst drifting along the drift path, wherein each turn corresponds to a completed orbit in the 2D reference plane;

wherein the injection interface includes at least one injection deflector located within the mass analyser, the at least one injection deflector being configured to deflect ions injected into the mass analyser in the direction of the drift path, wherein the injection interface is preferably configured so that ions guided along the 3D reference trajectory are, after injection into the mass analyser, kept adequately distant from the injection opening such that they are substantially unaffected by electric field distortions around the injection opening.

In this way, the at least one deflector of the injection interface may help to prevent ions coming too near to the injection opening after injection into the mass analyser (e.g. at around completion of the first turn in the mass analyser), and therefore may help to avoid said ions from being affected by electric field distortions around the injection opening, e.g. as caused by the injection opening or a fringe field corrector located near to the injection opening. This may help to improve beam timing properties, mass resolution and/or transmission efficiency, for example.

Here it is noted that the above definition refers to ions being kept adequately distant from the injection opening after injection into the mass analyser, i.e. after ions have been introduced into the mass analyser, and preferably after completion of the first half turn in the mass analyser, since clearly ions will be very close to the injection opening as they are being introduced into the mass analyser through the injection opening.

For avoidance of any doubt, when ions are described herein as being deflected "in the direction of the drift path", ions may be deflected either forwards or backwards in the direction of the drift path.

For a typical mass analyser, in order for ions guided along the 3D reference trajectory to be substantially unaffected by electric field distortions around the injection opening after injection into the mass analyser, the injection interface is preferably configured so that the 3D reference trajectory does not come closer than one 'electrode gap' (more preferably at least two electrode gaps, more preferably at least three electrode gaps) from the injection opening (e.g. at completion of the first turn in the mass analyser, and preferably at all locations on the 3D reference trajectory corresponding to ions after said ions have completed the first half turn in the mass analyser). Here an 'electrode gap' may be defined as the distance between an inner electrode and an outer electrode defining a gap in which ions reach at completion of their first turn in the mass analyser. These inner and outer electrodes may be sector electrodes defining an electrostatic sector or may be electrodes defining a field free region, for example.

For a typical instrument, an electrode gap may be 20 mm, for example. Accordingly in some embodiments, the injection interface is preferably configured so that the 3D reference trajectory does not come closer than 20 mm (more preferably 40 mm) from the injection opening (e.g. at completion of the first turn in the mass analyser), though of course this distance will vary from instrument to instrument.

If a fringe field corrector is used, the distance may be smaller, e.g. the injection interface may be configured so that the 3D reference trajectory does not come closer than 10 mm from the injection opening (preferably also the fringe field corrector), e.g. at completion of the first turn in the mass analyser, though of course this distance will vary from instrument to instrument e.g. depending on the configuration of the fringe field corrector, electrode gap size, etc.

Of course, the mass analyser will typically include lenses and other auxiliary electrodes in addition to the sector electrodes referred to above.

Preferably, the injection deflector is configured to deflect ions injected into the mass analyser in the direction of the drift path so as to increase the distance between the 3D reference trajectory and the injection opening, i.e. such that the ions guided along the 3D reference trajectory after injection of said ions into said mass analyser pass less close to the injection opening (e.g. at completion of the first turn in the mass analyser) than would have been case had the at least one injection deflector been absent. That is, the closest distance that the 3D reference trajectory comes to the injection opening (other than during injection) should be larger than would have been the case had the at least one injection deflector been absent. This is one way in which the injection interface may be configured so that ions guided along the 3D reference trajectory are, after injection into the mass analyser, kept adequately distant from the injection opening such that they are substantially unaffected by electric field distortions around the injection opening.

Alternatively, the injection interface may be configured to inject ions into the mass analyser with an initial trajectory such that ions are substantially unaffected by electric field distortions around the injection opening (e.g. with relatively large distances between adjacent turns), wherein the at least one injection deflector is configured to bring subsequent turns within the mass analyser closer together (than would have been the case had the at least one injection deflector been absent, see e.g. FIG. 7). This is another way in which the injection interface may be configured so that ions guided along the 3D reference trajectory are, after injection into the mass analyser, kept adequately distant from the injection opening such that they are substantially unaffected by electric field distortions around the injection opening.

Note that whilst each "turn" corresponds to a completed orbit in the 2D reference frame, ions do not actually complete an orbit in the 2D reference plane in practice, since they are drifting along the drift path and therefore follow an open 3D reference trajectory. For example, if the completed orbit in the 2D reference frame corresponds to a circle, and the drift path is linear, the 3D reference trajectory would have a helical shape (rather than a 2D circle).

Note also that the deflectors shown in FIG. 16A of U.S. Pat. No. 9,082,602B2 are external deflectors located outside of the mass analyser, so are not capable of operating as an injection deflector according to the first aspect of the present invention.

Note also that whilst FIG. 16B of U.S. Pat. No. 9,082,602B2 and FIG. 6 of "A High Resolution Multi-turn TOF Mass Analyser", V. Shchepunov et al, SHIMADZU REVIEW, Vol. 72, No. 3.4 (2015) both disclose use of reversing deflectors located within a mass analyser, these reversing deflectors are not used to increase the distance between the 3D reference trajectory and the injection opening (since ions have already passed close to the injection opening before they are reversed by these reversing deflectors), so these reversing deflectors are clearly not configured to operate as an injection deflector according to the first aspect of the present invention.

As is known in the art, sector electrodes can be understood as at least two electrodes having different potentials applied thereto so as to create an electrostatic field therebetween (typically this electrostatic field is locally perpendicular to a predetermined reference trajectory followed by ions) in order to guide ions along a curved predetermined reference trajectory that passes between the at least two sector electrodes at different potentials. The at least two sector electrodes arranged in this way may be referred to as an "electrostatic sector". Normally, this predetermined reference trajectory is a 2D trajectory, but according to this invention, the sector electrodes extend along a drift path, and the predetermined trajectory is a 3D reference trajectory according to which ions drift along a the drift path. Mass analysers which guide ions along such a 3D reference trajectory are disclosed in U.S. Pat. No. 9,082,602B2 (see e.g. FIG. 4, noting that here the drift path curves around a reference axis included in the reference plane), U.S. Pat. No. 7,504,620B2 (see e.g. FIG. 5, noting that here the drift path is linear), WO2011/086430A1 (see e.g. FIG. 11, noting that here the drift path is linear), and also in WO2018/033494A1 (see e.g. FIG. 6, noting that here the drift path is linear).

Preferably, the at least one injection deflector is configured to deflect ions injected into the mass analyser in the direction of the drift path before those ions have completed their first three turns, more preferably before those ions have completed their first two turns, more preferably before those ions have completed their first turn, more preferably before those ions have completed their first half turn, within the mass analyser.

This is important, because the injection deflectors need to be used adequately early in the flight path of ions injected into the mass analyser in order to keep ions adequately distant from the injection opening such that they are substantially unaffected by electric field distortions around the injection opening, whilst allowing adjacent turns of the 3D reference trajectory to be closely packed together for the majority of the flight path.

Herein "first turn" refers to the first turn that is completed by ions as they travel along the 3D reference trajectory after those ions have been injected into the mass analyser. Similarly, the "first two turns" refers to the first two turns that are completed by ions as they travel along the 3D reference trajectory after those ions have been injected into the mass analyser. And so on.

Most preferably, the at least one injection deflector is configured to deflect ions injected into the mass analyser in the direction of the drift path before those ions have completed their first turn within the mass analyser (e.g. at a location within the first half turn, or within the second half turn), preferably so as to increase the distance between the deflected ions completing the first turn and the injection opening. This is the most convenient route to increase the distance between the 3D reference trajectory and the injection opening. However, the at least one injection deflector could (for example) be positioned within the second or third turn—e.g. with the drift angle (pitch) being large before the injection deflector (allowing bypassing of electric field distortions near the injection opening within the first turn) and small after the injection deflector, as shown e.g. in FIG. 7. Various configurations could be envisaged by a skilled person in view of the disclosure herein.

Preferably, the drift path is curved. More preferably the drift path curve around a reference axis that lies in the 2D reference plane. Mass analysers implementing such a drift path are disclosed for example in U.S. Pat. No. 9,082,602B2 (see e.g. FIG. 4).

In other embodiments, the draft path may be linear, i.e. extending along a straight line. In this case, for ions of a given m/z value, the 2D reference plane will move along a straight line (thereby moving in the direction of the draft path) as the ions move along the 3D reference trajectory. Mass analysers implementing such a drift path are disclosed for example in U.S. Pat. No. 7,504,620B2 (see e.g. FIG. 5).

Other drift paths may also be envisaged, but may be challenging to implement.

The set of sector electrodes may be spatially arranged to provide an electrostatic field in the 2D reference plane suitable for guiding ions along potentially an orbit in the 2D reference plane that could have a variety of shapes. For example, the orbit could e.g. be O-shaped (e.g. circular, oval), a figure of eight, or another path corresponding to a periodic motion in the 2D reference plane.

For avoidance of any doubt, it is possible for the injection interface to include just one injection deflector (see e.g. FIG. 2A). However, multiple injection deflectors may be used, e.g. for more complex 3D reference trajectories involving a reversing deflector (see e.g. FIG. 4A).

The mass analyser may include an extraction interface configured to extract ions out from the mass analyser via an extraction opening after the ions being extracted out from the mass analyser have been guided by the 3D electrostatic field region along the 3D reference trajectory.

Preferably, the extraction interface includes at least one extraction deflector, located within the mass analyser, the at least one extraction deflector being configured to deflect ions following the 3D reference trajectory in the direction of the drift path, wherein the extraction interface is preferably configured so that ions guided along the 3D reference trajectory are, before extraction out from the mass analyser, kept adequately distant from the extraction opening such that they are substantially unaffected by electric field distortions around the extraction opening.

More preferably, the extraction deflector is configured to deflect ions following the 3D reference trajectory the mass analyser in the direction of the drift path so as to increase the distance between the 3D reference trajectory and the extraction opening, i.e. such that the ions guided along the 3D reference trajectory before extraction of said ions out from the mass analyser pass less close to the extraction opening (e.g. when starting the last turn in the mass analyser) than would have been the case had the at least one extraction deflector been absent. That is, the closest distance that the 3D reference trajectory comes to the extraction opening (other than during extraction) should be larger than would have been the case had the at least one extraction deflector been absent. This is the preferred way in which the extraction interface may be configured so that ions guided along the 3D reference trajectory are, before extraction out from the mass analyser, kept adequately distant from the extraction opening such that they are substantially unaffected by electric field distortions around the extraction opening.

In this way, the at least one extraction deflector may help to prevent ions coming too near to the extraction opening before extraction of those ions from the mass analyser (e.g. upon starting their last turn), and therefore may help to avoid said ions from being affected by electric field distortions around the extraction opening, e.g. as caused by the extraction opening or a fringe field corrector located near to the extraction opening. This may help to improve beam timing properties, mass resolution and extraction efficiency.

Here it is noted that the above definition refers to ions being kept adequately distant from the extraction opening before extraction out from the mass analyser, i.e. before ions are extracted out from the mass analyser, and preferably when ions start their last turn in the mass analyser, since clearly ions will be very close to the injection opening as they are being extracted out from the mass analyser through the extraction opening.

For a typical mass analyser, in order for ions guided along the 3D reference trajectory to be substantially unaffected by electric field distortions around the extraction opening before extraction from the mass analyser, the extraction interface is preferably configured so that the 3D reference trajectory does not come closer than one 'electrode gap' (more preferably at least two electrode gaps, more preferably at least three electrode gaps) from the extraction opening (e.g. when starting the last turn in the mass analyser, and preferably at all locations on the 3D reference trajectory corresponding to ions before said ions start the last half turn in the mass analyser). Here an 'electrode gap' may be defined as the distance between an inner electrode and an outer electrode defining a gap in which ions reach as they start their last turn in the mass analyser. These inner and outer electrodes may be sector electrodes defining an electrostatic sector or may be electrodes defining a field free region, for example.

For a typical instrument, an electrode gap may be 20 mm, for example. Accordingly in some embodiments, the extraction interface is preferably configured so that the 3D reference trajectory does not come closer than 20 mm (more preferably 40 mm) from the extraction opening (e.g. when starting the last turn in the mass analyser), though of course this distance will vary from instrument to instrument.

If a fringe field corrector is used, the distance may be smaller, e.g. the extraction interface may be configured so that the 3D reference trajectory does not come closer than 10 mm from the extraction opening (preferably also the fringe field corrector), e.g. when starting the last turn in the mass analyser, though of course this distance will vary from instrument to instrument depending on the configuration of the fringe field corrector, electrode gap size, etc.

The extraction interface is not a required feature of this aspect of the invention, since an ion detector (for detecting ions that travel along the 3D reference trajectory) may in some embodiments be located within the mass analyser.

For avoidance of any doubt, it is possible for the extraction interface to include just one extraction deflector (see e.g. FIG. 2A). However, multiple extraction deflectors may be used, e.g. for more complex 3D reference trajectories involving a reversing deflector (see e.g. FIG. 4A).

Preferably, the at least one extraction deflector is configured to deflect ions which are to be extracted out from the mass analyser in the direction of the drift path after those ions have started their last three turns, more preferably after those ions have started their last two turns, more preferably after those ions have started their last turn, more preferably after those ions have started their last half turn, within the mass analyser.

This is important, because the extraction deflectors need to be used adequately late in the flight path of ions injected into the mass analyser in order to keep ions adequately distant from the extraction opening such that they are substantially unaffected by electric field distortions around the extraction opening, whilst allowing adjacent turns of the 3D reference trajectory to be closely packed together for the majority of the flight path.

Herein "last turn" refers to the last (final) turn that is completed by ions as they travel along the 3D reference trajectory before those ions are extracted from the mass analyser. Similarly, the "last two turns" refers to the last two turns that are completed by ions as they travel along the 3D reference trajectory before those ions are extracted from the mass analyser. And so on.

Most preferably, the at least one extraction deflector is configured to deflect ions which are to be extracted out from the mass analyser in the direction of the drift path after those ions have started their last turn within the mass analyser (e.g. at a location within the last half turn, or within the second from last half turn), preferably so as to increase the distance between the deflected ions entering their last turn and the extraction opening. This is the most convenient route to increase the distance between the 3D reference trajectory and the extraction opening. However, the at least one extraction deflector could (for example) be positioned within the second from last or third from last turn—e.g. with the drift angle (pitch) being big after the extraction deflector (allowing bypassing of electric field distortions near the extraction opening within the last turn) and small before the extraction deflector. Various configurations could be envisaged by a skilled person in view of the disclosure herein.

The injection opening and the extraction opening may be the same opening (though this is not shown in the drawings).

Preferably, the at least one injection deflector is used as the at least one extraction deflector (see e.g. FIG. 4A), in which case the at least one injection deflector may be referred to as the at least one injection/extraction deflector. Such an arrangement may be achieved by the mass analyser including a reversing deflector set (as discussed below, see e.g. FIG. 4A). In such an arrangement, the same deflector(s) which serve as both the at least one injection deflector and the at least one extraction deflector, may also serve as a second reversing deflector set (see FIG. 4A).

If the drift path is curved around a reference axis, then preferably the 3D reference trajectory includes at least one pair of adjacent turns for which an angle measured using straight lines extending from the reference axis to corresponding vertices of the adjacent turns of the 3D reference trajectory as projected in a plane perpendicular to the reference axis is less than 10°, more preferably 7° or less, more preferably 6° or less, or in some cases 5° or less, 4° or less, or even 3° or less. This angle for a given pair of adjacent turns, may be referred to as the "drift angle" or "pitch" between the adjacent turns. Preferably there are at least two, more preferably at least five, more preferably at least ten, more preferably at least twenty, pairs of adjacent turns meeting this criteria. For avoidance of any doubt, the adjacent turns included in each pair need not be exclusive to one pair. The pair(s) of turns meeting this criteria may be positioned after the injection interface and/or before the extraction interface on the 3D reference trajectory.

Herein, a "vertex" of the 3D reference trajectory as projected in a plane can be understood as an extreme point, e.g. minimum of maximum, of the projection.

If the drift path is linear, then preferably the 3D reference trajectory includes at least one turn for which an angle measured using straight lines extending between three consecutive (following each other along the 3D reference trajectory) vertices of the 3D reference trajectory as projected in a plane perpendicular to the 2D reference plane is less than 5°, more preferably 3.5° or less, more preferably 3° or less, or in some cases 2.5° or less, 2° or less, or even 1.5° or less. This angle for a given turn may be referred to as the "drift angle" or "pitch" of the turn. Note that the values given here are halved compared with the values given for the curved drift path case, since here the drift angle is defined by an individual turn, rather than between two adjacent turns. Note also that there are many possible planes perpendicular to the 2D reference plane, and any one of these possibly planes (preferably a predetermined one of such planes) may be chosen in accordance with the above definition. Preferably there are at least two, more preferably at least five, more preferably at least ten, more preferably at least twenty, turns meeting this criteria. The turn(s) meeting this criteria may be positioned after the injection interface and/or before the extraction interface on the 3D reference trajectory.

The mass analyser may include a reversing deflector set, wherein the reversing deflector set includes one or more reversing deflectors configured to reverse the direction in which ions drift along the drift path, so that ions drifting towards the reversing deflector set are made to drift back towards the injection interface.

In this way, ions can be made to complete two "passes" of the mass analyser, wherein each "pass" is the completion of the predetermined 3D reference trajectory in either a "forwards" direction (according to which ions drift towards the reversing deflector) or a "backwards" direction (according to which ions drift away from the reversing deflector set).

If the mass analyser includes a reversing deflector set, then conveniently, the at least one injection deflector may be additionally be configured to operate as the at least one extraction deflector (by applying different voltages to the at least one injection/extraction deflector at the appropriate time), as is the case for the example shown in FIG. 4A.

The mass analyser may include a second reversing deflector set (in which case the reversing deflector set described in the previous paragraph may be referred to as the "first" reversing deflector set), wherein the second reversing deflector set includes one or more reversing deflectors configured to reverse the direction in which ions drift along the drift path, so that ions drifting towards the second reversing deflector set are made to drift back towards the first reversing deflector set.

In this way, ions can be made to complete more than two "passes" of the mass analyser.

Conveniently, the at least one injection deflector may be configured to additionally operate as the second reversing deflector set (by applying different voltages to the at least one injection deflector at the appropriate times). In other words, one or more deflectors may be used as the at least one injection deflector and as the second reversing deflector set. This helps to reduce the number of deflectors included within the mass analyser.

Conveniently, the at least one extraction deflector (if present) may be configured to additionally operate as a reversing deflector set (by applying different voltages to the at least one extraction deflector at the appropriate times). In other words, one or more deflectors may be used as the at least one extraction deflector and a reversing deflector set. This helps to reduce the number of deflectors included within the mass analyser. Preferably, the at least one extraction deflector is configured to additionally operate as the second reversing deflector set, but it is alternatively possible for the at least one extraction deflector to instead additionally operate as the first reversing deflector set.

In a preferred arrangement, the at least one injection deflector is configured to additionally operate as the at least one extraction deflector, and as a reversing deflector set (by applying different voltages to the at least one injection/extraction deflector at the appropriate time), as is the case for the example shown in FIG. 4A. In other words, one or more deflectors may be used as the at least one injection deflector, the at least one extraction deflector and the second reversing deflector set. This helps to reduce the number of deflectors included within the mass analyser. Preferably, the at least one injection/extraction deflector is configured to additionally operate as the second reversing deflector set, but it is alternatively possible for the at least one injection/extraction deflector to instead additionally operate as the first reversing deflector set.

Each reversing deflector set might optionally change the speed at which ions drift along the drift path, but preferably just changes the direction in which ions drift along the drift path (to keep the packing of the 3D reference trajectory in the drift direction the same).

Any above-described deflector may typically include at least one (preferably two) electrodes configured to deflect ions in the direction of the drift path.

Any above-described deflector (optionally the/each above-described deflector) may include additional electrodes configured to deflect ions in a transverse direction (referred to as the "transverse direction" herein) that is locally perpendicular to the reference trajectory and to the direction of the drift path (referred to as the "drift direction" herein). Being able to deflect ions in the transverse direction may be useful for steering ions to compensate for alignment errors in the set of sector electrodes, or if embedding a deflector in a focussing lens electrode. Of course, both the transverse direction and the drift direction are both transverse to the reference trajectory.

Deflectors capable of deflecting ions in a predetermined direction are well known, and the precise form of the/each deflector is not viewed as being particularly important to the invention.

By way of example, any above-described deflector (optionally the/each above-described deflector) may include a pair of parallel plates configured to deflect ions in the direction of the drift path (by having appropriate voltages applied thereto), and may optionally include an additional pair of parallel plates configured to deflect ions in the transverse direction.

By way of example, any above-described deflector (optionally the/each above-described deflector) may be a multipole configured to deflect ions in the direction of the drift path (by having appropriate voltages applied thereto), and may optionally be further configured to deflect ions in the transverse direction (by having appropriate voltages applied thereto).

The 3D reference trajectory preferably includes field regions along which the 3D reference trajectory is enclosed by sector electrodes included in the set of sector electrodes, and field free regions along which the 3D reference trajectory is not enclosed by sector electrodes included in the set of sector electrodes. The field regions may be regions in which the projection of the 3D reference trajectory onto the 2D reference plane is curved, since sector electrodes are generally needed to change the direction of ions within the 2D reference plane.

Of course, in general terms, a "field free" region will only be comparatively free of electric fields, since fields produced elsewhere will generally leak into the field free regions (such leaked fields are known as so-called 'fringe fields'—this is a piece of established terminology).

Preferably, any above-described deflector (optionally the/each above-described deflector) is (respectively) positioned at a location along the 3D reference trajectory at which the 3D reference trajectory is not surrounded by sector electrodes (i.e. in a field free region of the 3D reference trajectory) since it is practically quite difficult to located deflectors between sector electrodes which surround the 3D reference trajectory.

The mass analyser may include one or more focussing lens electrodes configured to focus ions towards the 3D reference trajectory. Any above-described deflector (optionally the/each above-described deflector) may be located within a (respective) focussing lens electrode.

Any above-described deflector (optionally the/each above-described deflector) may be configured to steer ions to compensate for alignment errors in the set of sector electrodes. In this case, the/each deflector configured to steer ions to compensate for alignment errors in the set of sector electrodes preferably includes at least two (preferably four) electrodes configured to deflect ions in the direction of the drift path, and at least two (preferably four) additional electrodes configured to deflect ions in a transverse direction that is locally perpendicular to the reference trajectory and to the drift path.

The 3D reference trajectory is preferably a single 3D reference trajectory that is the same for ions of all m/z value.

Here, it is to be understood that whilst ions having different initial coordinates and velocities are preferably all guided along a single predetermined 3D reference trajectory, the ions may in reality deviate slightly from that trajectory e.g. due to small variations in their initial position or velocity.

The 3D reference trajectory may be defined as extending between a start point and an end point. The start point of the 3D reference trajectory may be defined as a location outside or inside the ion source. This point would typically be outside the ion source (if present) and outside of the mass analyser. The end point of the 3D reference trajectory may be defined as a location at or close to an ion detector for detecting ions that have been guided along the predetermined 3D reference trajectory. This point may be outside or inside the mass analyser.

Preferably, the set of electrodes includes drift focussing electrodes configured to provide drift focussing, e.g. to focus ions in a direction of the drift path at one or more locations along the predetermined 3D reference trajectory. Preferably, the focussing of ions by the drift focussing electrodes is toward the 3D reference trajectory at the one or more locations along the 3D reference trajectory. This can help to keep ions close to the predetermined 3D reference trajectory (see e.g. FIG. 14B) and can also help to achieve isochronicity (as discussed in detail in U.S. Pat. No. 9,082,602B2, for example).

Preferably, the drift focussing electrodes are configured to provide drift focussing by producing an electrostatic field whose potential has a non-zero second order derivative and/or higher order derivatives producing focusing in the direction of the drift path. Example forms of draft focussing electrodes are set out in U.S. Pat. No. 9,082,602B2, for example.

The 3D reference trajectory may be an open trajectory or a closed trajectory. In this context, a "closed" 3D reference trajectory preferably refers to a trajectory along which a reference ion moving along the 3D reference trajectory returns to substantially the same point at substantially the same velocity. Conversely, an "open" 3D reference trajectory preferably refers to a trajectory along which a reference ion moving along the 3D reference trajectory does not return to substantially the same point at substantially the same velocity.

The mass analyser may be configured as a TOF mass analyser and/or an E-Trap mass analyser. A TOF mass analyser may be viewed as a mass analyser for separating ions according to their mass-to-charge ratios due to dependency of their times of flight through the mass analyser on their mass-to-charge ratios. An E-Trap mass analyser may be viewed as a mass analyser for trapping ions in one or more orbits. In an E-Trap mass spectrometer, the mass-to-charge ratios of ions can be measured using an image current detection technique.

In the case of the mass analyser being configured as a TOF mass analyser, the predetermined 3D reference trajectory may be open or closed. Having a closed predetermined reference trajectory may be advantageous to extend the path length ions travel in the TOF mass analyser.

The mass analyser may be configured to have a "multi pass" mode of operation in which ions are guided along a predetermined 3D reference trajectory, which has a closed portion, with the ions repeating the closed portion of the predetermined 3D reference trajectory multiple times, thereby increasing the overall flight time. Here, each repeated closed portion of the 3D reference trajectory can be viewed as a "pass". A multi pass mode of operation may be achieved using reversing deflectors as described above, for example.

The first aspect of the invention may provide a mass spectrometer having:

- an ion source for producing ions having different initial coordinates and velocities;
- a mass analyser according to the first aspect of the invention, wherein the injection interface is configured to inject ions produced by the ion source into the mass analyser via the injection opening such that the ions are guided along the 3D reference trajectory;
- an ion detector for detecting ions produced by the ion source after the ions have been guided along the 3D reference trajectory.

If the mass analyser includes an extraction interface (see above), the ion detector may be for detecting ions after the ions have been extracted from the mass analyser by the extraction interface via the extraction opening. Alternatively, the ion detector could be located within the mass analyser.

The mass spectrometer may have a processing apparatus for acquiring mass spectrum data representative of the mass/charge ratio of ions produced by the ion source based on an output of the ion detector.

The ion source may include a vacuum ionisation source or an atmospheric pressure ion source.

Preferably, the ion source is configured to produce ions having different initial coordinates and velocities in short bunches, e.g. with each bunch of ions being produced in a short period of time, e.g. within a period of 1 nanosecond (or less). Such bunches can be produced using a pulsed ion source, e.g. a MALDI ion source, or an Orthogonal TOF ion source, a 2D or 3D ion trap devices.

Ion bunches may be selected using any one of: an orthogonal gate, a MALDI ion source, an RF ion guide, an RF ion trap.

The ion detector may include a time of flight ion detector for producing an output representative of the time of flight (through the mass analyser) of ions produced by the ion source and/or an image charge/current ion detector for producing an output representative of an image current caused by ions produced by the ion source.

If the mass analyser is configured as a TOF mass analyser (see above), the processing apparatus is preferably for acquiring mass spectrum data representative of the mass/charge ratio of ions produced by the ion source based on an output of the TOF ion detector. Methods for acquiring data in this manner are well known in the art.

If the mass analyser is configured as an E-Trap mass analyser (see above), the processing apparatus is preferably for acquiring mass spectrum data representative of the mass/charge ratio of ions produced by the ion source based on conversion of a time domain image charge/current signal obtained by an image charge/current detector into the frequency domain, e.g. using a Fourier analysis. Methods for acquiring data in this manner are well known in the art.

A second aspect of the invention provides:

A mass analyser for use in a mass spectrometer, the mass analyser having:

- a set of sector electrodes spatially arranged to provide an electrostatic field in a 2D reference plane suitable for guiding ions along an orbit in the 2D reference plane, wherein the set of sector electrodes extend along a drift path that is locally orthogonal to the reference plane so that, in use, the set of sector electrodes provide a 3D electrostatic field region; and
- an extraction interface configured to extract ions out from the mass analyser via an extraction opening after the ions extracted out from the mass analyser have been guided by the 3D electrostatic field region along a 3D reference trajectory according to which ions perform multiple turns within the mass analyser whilst drifting along the drift path, wherein each turn corresponds to a completed orbit in the 2D reference plane;
- wherein the extraction interface includes at least one extraction deflector, located within the mass analyser, the at least one extraction deflector being configured to deflect ions following the 3D reference trajectory in the direction of the drift path, wherein the extraction interface is preferably configured so that ions guided along the 3D reference trajectory are, before extraction out from the mass analyser, kept adequately distant from the extraction opening such that they are substantially unaffected by electric field distortions around the extraction opening.

Preferably, the extraction deflector is configured to deflect ions following the 3D reference trajectory in the direction of the drift path so as to increase the distance between the 3D reference trajectory and the extraction opening, i.e. such that the ions guided along the 3D reference trajectory before extraction of said ions out from the mass analyser pass less close to the extraction opening (e.g. when starting the last turn in the mass analyser) than would have been case had the at least one extraction deflector been absent. This is the preferred way in which the extraction interface may be configured so that ions guided along the 3D reference trajectory are, before extraction out from the mass analyser, kept adequately distant from the extraction opening such that they are substantially unaffected by electric field distortions around the extraction opening.

In this way, the at least one extraction deflector may help to prevent ions coming too near to the extraction opening before extraction of those ions from the mass analyser (e.g. upon starting their last turn), and therefore may help to avoid said ions from being affected by electric field distortions around the extraction opening e.g. as caused by the extraction opening or a fringe field corrector located near to the extraction opening.

The mass analyser according to the second aspect of the invention may have any feature as described in connection with the first aspect of the invention.

The mass analyser according to the second aspect of the invention may have an injection interface according to the first aspect of the invention, but such an interface is optional for this second aspect of the invention since the ion source could be located within the mass analyser.

If the mass analyser includes an injection interface (see above), the injection interface may be configured to inject ions produced by the ion source into the mass analyser via the injection opening such that the ions are guided along the 3D reference trajectory. Alternatively, the ion source could be located within the mass analyser.

The second aspect of the invention may provide a mass spectrometer having:

- an ion source for producing ions having different initial coordinates and velocities;
- a mass analyser according to the second aspect of the invention, wherein the mass analyser is configured to guide ions produced by the ion source along the 3D reference trajectory;
- an ion detector for detecting ions produced by the ion source after the ions have travelled along the 3D reference trajectory and have been extracted from the mass analyser by the extraction interface via the extraction opening.

The mass spectrometer according to the second aspect of the invention may have any feature described in connection with the mass spectrometer according to the first aspect of the invention, except that the mass analyser is not required to have an injection interface as described in relation to the first aspect of the invention.

The present invention may include a method of operating a mass analyser or a mass spectrometer as disclosed herein. The method may include any method step implementing or corresponding to any apparatus feature described in connection with any above aspect of the invention.

The present invention may include a method of configuring a mass analyser to provide a mass analyser as disclosed herein. The method may include configuring one or more deflectors of the mass analyser to compensate for alignment errors in a set of sector electrodes of the mass analyser. The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIGS. 12A(i)-C(ii) show example combined parallel plate and multipole deflectors.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

In the following examples, additional deflectors located within a mass analyser are used to cause ions to fly farther away from the injection and extraction openings which cause large electric field distortions. This helps to improves analyser mass resolution.

In addition, this also allows for an increased number of "turns" performed by ions within the mass analyser, which again helps to improve mass resolution.

Finally, injection and extraction deflectors can be used for additional steering to compensate for possible alignment errors of the main electrodes, e.g. to reduce losses of ions on reversing deflectors and/or small extraction openings. This may help to improve transmission efficiency.

In the examples shown, small additional deflectors are included, in addition to the sector electrodes of a mass analyser. The purpose of the deflectors in these examples is to deflect ions in the drift direction so as to increase distances from the injection opening to the first turn ion trajectories and from the extraction opening to the last turn ion trajectories. This means that field distortions at the injection/extraction openings have a significantly lowered influence on mass resolution and transmission efficiency. At least one injection deflector is needed in order to deflect ions away from the injection opening (if present). At least one extraction deflector is needed in order to deflect ions away from the extraction opening (if present). The same deflector(s) may be used as both injection and extraction deflectors. The deflectors are positioned inside the mass analyser, preferably in a field free region. Alternatively, they can be embedded into internal focussing lens electrodes. Apart from the main purpose of bypassing the areas of poor field quality the injection/extraction deflectors can also be used for additional steering in the two transverse directions to compensate for possible alignment errors of the main electrodes.

Figure 1A:
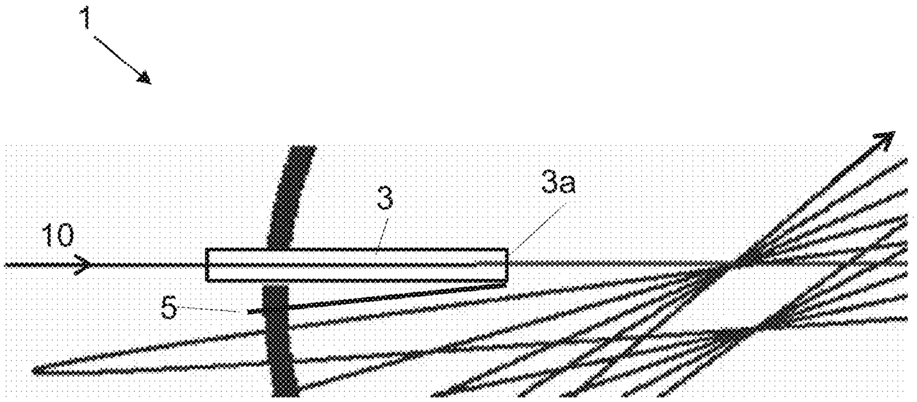
FIGS. 1A and 1B show a mass analyser implementing the disclosure of U.S. Pat. No. 9,082,602B2.
Figure 1B:
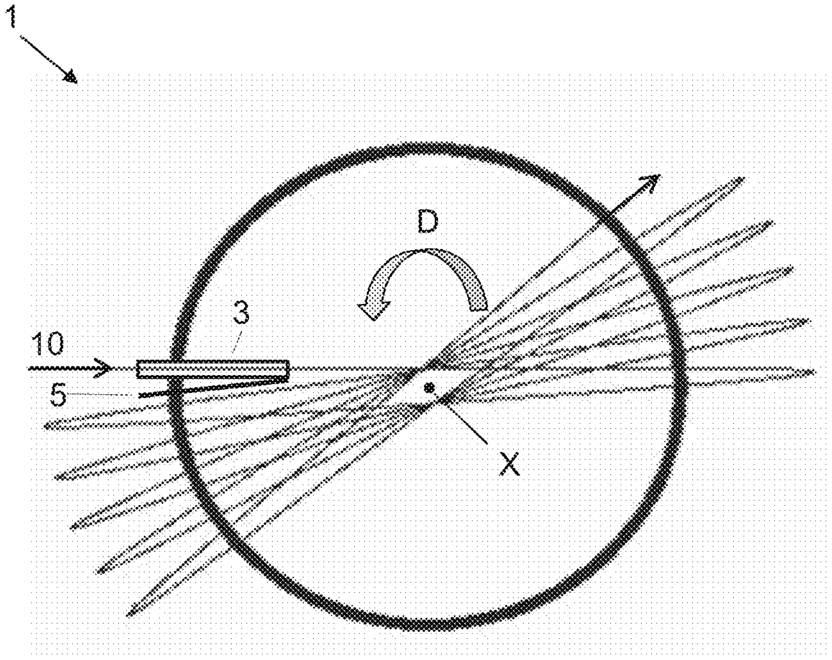

FIGS. 1A and 1B show a mass analyser implementing the disclosure of U.S. Pat. No. 9,082,602B2.

This mass analyser includes:

a set of sector electrodes spatially arranged to provide an electrostatic field in a reference plane suitable for guiding ions along an orbit in the 2D reference plane, wherein the set of sector electrodes extend along a drift path D that is locally orthogonal to the reference plane so that, in use, the set of sector electrodes provide a 3D electrostatic field region; and an injection interface configured to inject ions into the mass analyser via an injection opening such that the ions injected into the mass analyser are guided by the 3D electrostatic field region along a 3D reference trajectory according to which ions perform multiple turns within the mass analyser whilst drifting along the drift path, wherein each turn corresponds to a completed orbit in the 2D reference plane.

As depicted, the reference plane is perpendicular to the page on which FIGS. 1A and 1B are shown.

In FIGS. 1A and 1B, a mass analyser 1 is shown with ions 10 being injected from an external ion source (not shown) via an injection opening 3*a* at the distal end of an injection tube 3.

At the end of the first turn ion pass the region near the injection opening 3*a* of the injection tube 3, at which location the electrostatic field produced by the sector electrodes of the mass analyser is distorted by the presence of the injection tube 3.

Thus, as taught by U.S. Pat. No. 9,082,602B2, a PCB fringe field corrector 5 is used to compensate electric field distortions at the injection opening 3*a*. This PCB fringe field corrector 5 is described in detail in U.S. Pat. No. 9,082,602B2, with reference to FIG. 15D of U.S. Pat. No. 9,082,602B2. A similar PCB fringe field corrector may also be used at an extraction opening of the mass analyser (not shown).

A disadvantage of the PCB fringe field corrector 5 shown in FIGS. 1A and 1B is that ions may pass too close to the corrector 5. This problem is exacerbated at small analyser sizes or small drift angles (i.e. a larger number of turns). In such cases both the analyser mass resolving power and transmission efficiency may be reduced. Besides, misalignments of the correctors or their poor fabrication quality may contribute to degradation of the same key parameters.

Figure 2A:
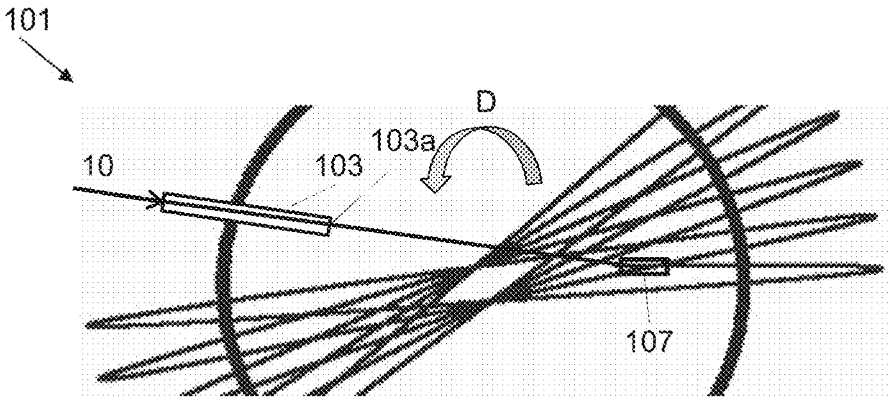
FIGS. 2A and 2B show a mass analyser implementing the present invention.
Figure 2B:
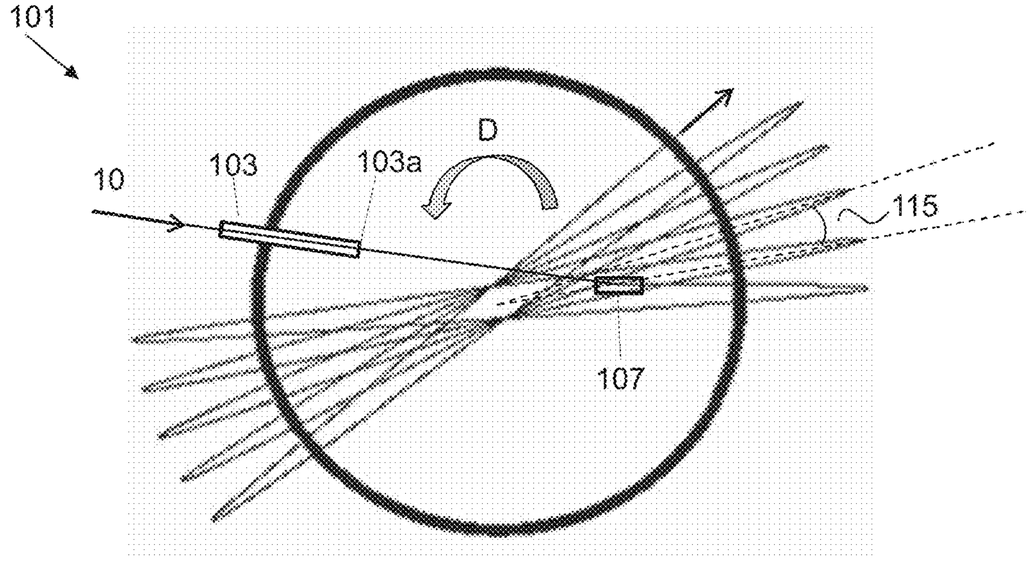

FIGS. 2A and 2B show a mass analyser 101 implementing the present invention.

In this example, the injection interface includes a single injection deflector 107, located within the mass analyser, the injection deflector 107 being configured to deflect ions injected into the mass analyser in the direction of the drift path D before those ions have completed a first turn within the mass analyser so as to increase the distance between the deflected ions completing the first turn and the injection opening 103*a*. Note that as a result of including the injection deflector 107, the distance between the 3D reference trajectory and the injection opening 103*a* is significantly increased, that is ions following the 3D reference trajectory pass less close to the injection opening 103*a* than would have been case had the injection deflector 107 been absent.

Thus the injection deflector 107 is used to increase distance from ions moving within the mass analyser to the injection tube 103 (other than ions entering the mass analyser through the injection tube) and therefore the injection opening 103*a*. The distance is preferably made large enough, so that influence of the field distortion by the tube 103 on the ion optics of the mass analyser is negligible, and so that a PCB fringe field corrector 105 is not required.

As depicted in FIGS. 2A and 2B a PCB fringe field corrector 5 is not used. However, in other examples (not shown), a PCB fringe field corrector 5 may be used, but its influence on the ion beam will be substantially reduced as a result of the primary deflector 107.

In this example, the primary deflector 107 is located in a field free region of the 3D reference trajectory about halfway through the first closed orbit ("turn") completed by the ions.

Figure 3:
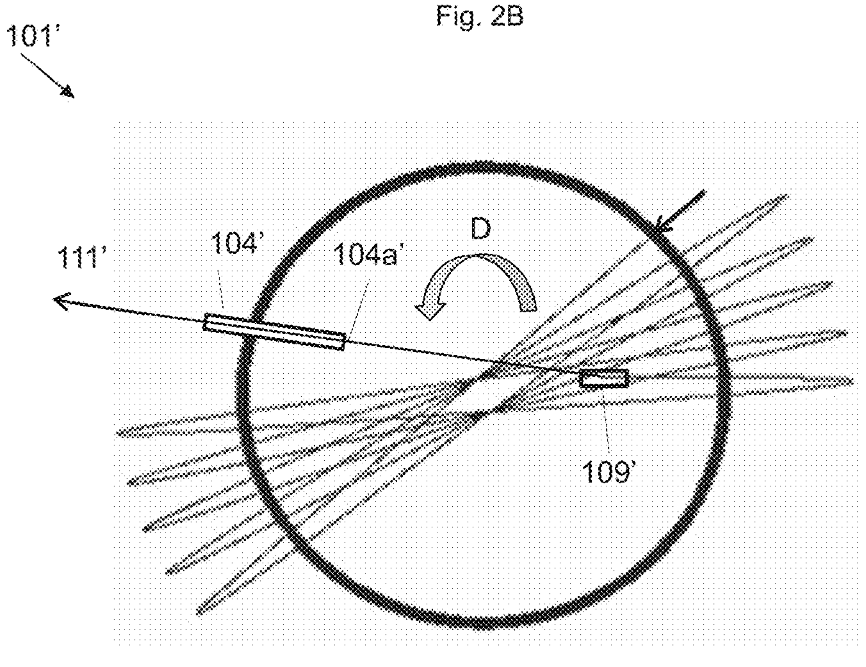
FIG. 3 shows another mass analyser implementing the present invention.

FIG. 3 shows another mass analyser 101' implementing the present invention.

In this example, an extraction interface includes a single extraction deflector 109', located within the mass analyser, the extraction deflector 109' being configured to deflect ions following a 3D reference trajectory in the direction of the drift path D after those ions have started their last turn within the mass analyser so as to increase the distance between the deflected ions entering their last turn and an extraction opening 104*a*' at the distal end of an extraction tube 104'. The extracted ions 111' may then be detected by a suitable detector, e.g. a TOF detector. Note that as a result of including the injection deflector 107, the distance between the 3D reference trajectory and the extraction opening 104*a*' is significantly increased, that is ions following the 3D reference trajectory pass less close to the extraction opening 104*a*' than would have been case had the extraction deflector 109' been absent.

In the example of FIG. 2 only a single injection deflector 107 is used. The inventor notes that it is possible (by appropriately locating this deflector 107 and setting the deflection it provides accordingly, as well as appropriately setting up the injection tube 103) to both ensure that ions completing their first turn are adequately spaced from the injection opening 103*a*, whilst also achieving a small angle (in the drift direction D) between adjacent turns of the 3D reference trajectory.

Similarly, in the example of FIG. 3, only a single extraction deflector 109' is used. The inventor notes that it is possible (by appropriately locating this deflector 109' and setting the deflection it provides accordingly, as well as appropriately setting up the extraction tube 104') to both ensure that ions entering their last turn are adequately spaced from the extraction opening 104*a*', whilst also achieving a small angle (in the drift direction D) between adjacent turns of the 3D reference trajectory.

However, as will now be described in relation to FIGS. 4A and 4B, if reversing deflectors are used, the considerations are more complex and it is generally preferred to use more than one injection deflector and more than one extraction deflector, and preferably the same injection deflectors are also used as the extraction deflectors, to avoid ions hitting these deflectors.

Figure 4A:
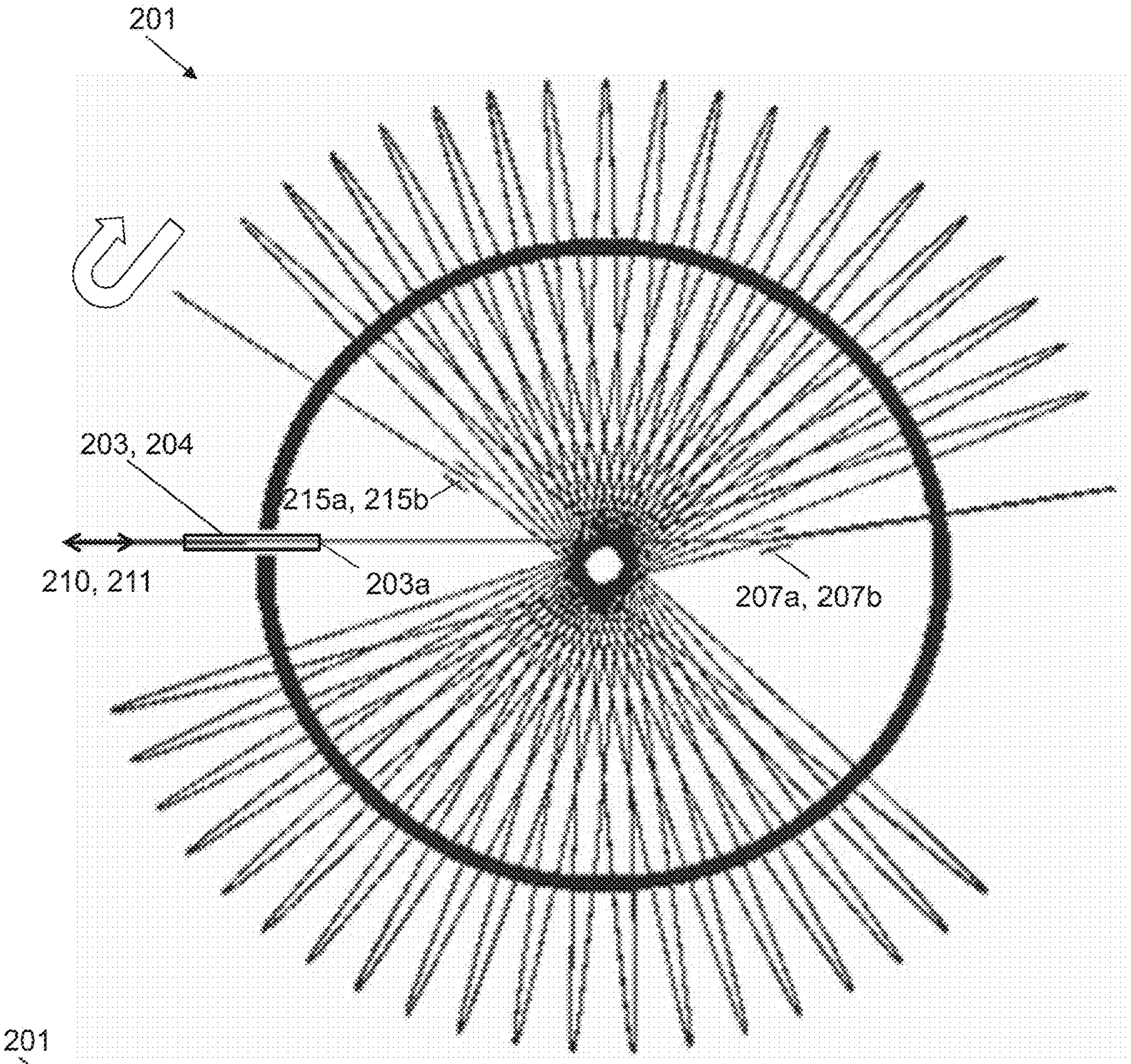
FIGS. 4A and 4B show another mass analyser implementing the present invention.
Figure 4B:
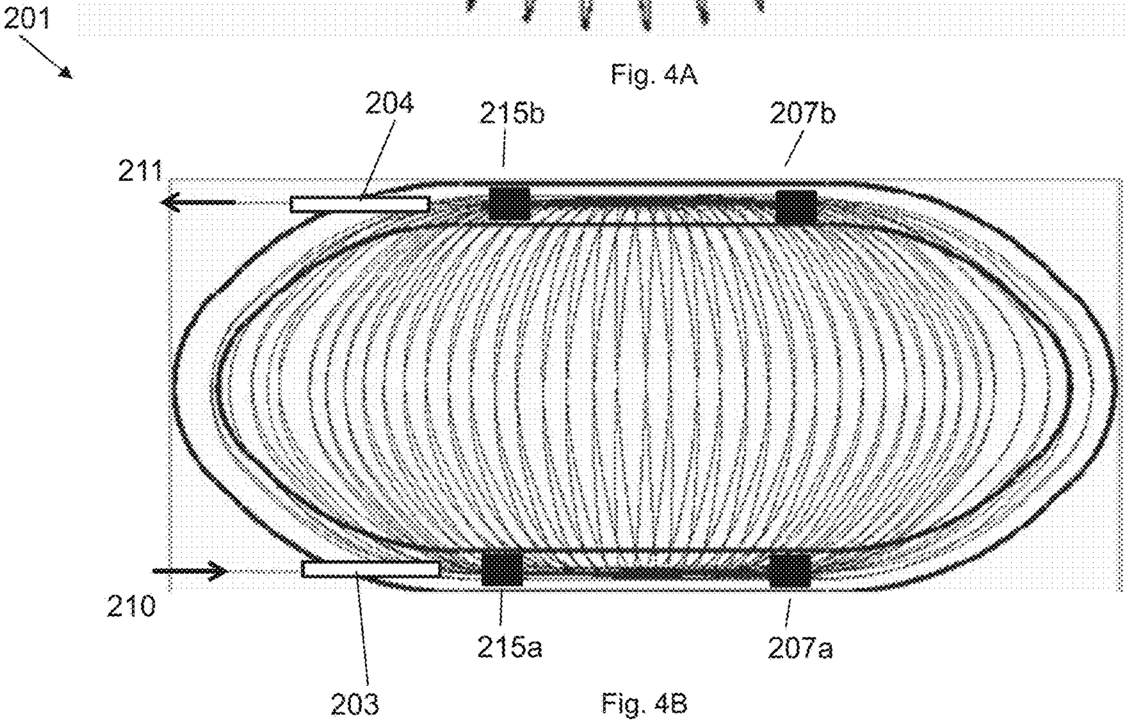

FIGS. 4A and 4B show another mass analyser 201 implementing the present invention.

In this example, an injection interface which includes an injection tube 203 also includes injection deflectors 207*a*, 207*b*.

The injection deflectors 207*a*, 207*b* are configured to deflect ions injected into the mass analyser via an injection opening 203*a* of the injection tube 203 in the direction of the drift path before those ions have completed a first turn within the mass analyser so as to increase the distance between the deflected ions completing the first turn and the injection opening.

In this example, the mass analyser includes a reversing deflector set that includes two reversing deflectors 215*a*, 215*b* wherein the reversing deflectors 215*a*, 215*b* are configured to reverse the direction in which ions drift along the drift path, so that ions are made to drift back towards the injection interface.

Thus, in this example, ions are made two perform two "passes" of the instrument before extraction. The reason for including two injection deflectors 207*a*, 207*b* can best be understood from the discussion of FIG. 5B below. The reason for including two reversing deflectors 215*a*, 215*b* here is to improve isochronous properties in the drift direction, and also because it is technically difficult to position a single reversing deflector inside the main sector S2.

In this example, the injection and extraction tubes 203, 204 are located one above the other (see FIG. 4B), and the injection deflectors 207*a*, 207*b* are also used as extraction deflectors (by applying appropriate voltages at the appropriate times), and are therefore referred to as injection/extraction deflectors 207*a*, 207*b*.

The injection/extraction deflectors 207*a*, 207*b* are configured to, when used as extraction deflectors, deflect ions following the 3D reference trajectory in the direction of the drift path after those ions have started their last turn within the mass analyser so as to increase the distance between the deflected ions entering their last turn and the extraction opening.

In this example, the injection/extraction deflectors 207*a*, 207*b* are located one above the other in field free regions of the 3D reference trajectory, as are the injection and extraction tubes 203, 204, thus the azimuthal positions of the injection and extraction tubes 203, 204 coincide (see FIG. 4B). Such a layout helps to provide maximum flight path length and hence mass maximum resolving power m/dm.

With the layout shown in FIGS. 4A and 4B, the deflectors 207*a*, 207*b* are used for both injection (where ions are deflected by both of them over the first half-turn) and for extraction (where ions pass through and deflected by both of them over the last half-turn before extraction).

In this example, it is envisaged that each deflector 207*a*, 207*b* take the form of parallel plates, separated in a direction of the drift path, wherein the potentials on the two plates are not equal, even at equal geometry parameters, so as to provide deflection.

Since the same deflectors 207*a*, 207*b* are used for injection and extraction, the potentials applied to these deflectors 207*a*, 207*b* are preferably switchable so that the potentials applied to the deflectors 207*a*, 207*b* for injection are swapped to the potentials applied to the deflectors 207*a*, 207*b* for extraction, before extraction begins.

By extending the flight path, the mass resolving power m/dm can be increased.

In the example shown in FIGS. 4A and 4B (preferably also the examples shown in FIGS. 2-3), the deflectors of the injection and extraction interfaces are preferably located in field free regions of the 3D reference trajectory, in the upper and lower (polar) regions of the mass analyser.

Figure 5A:
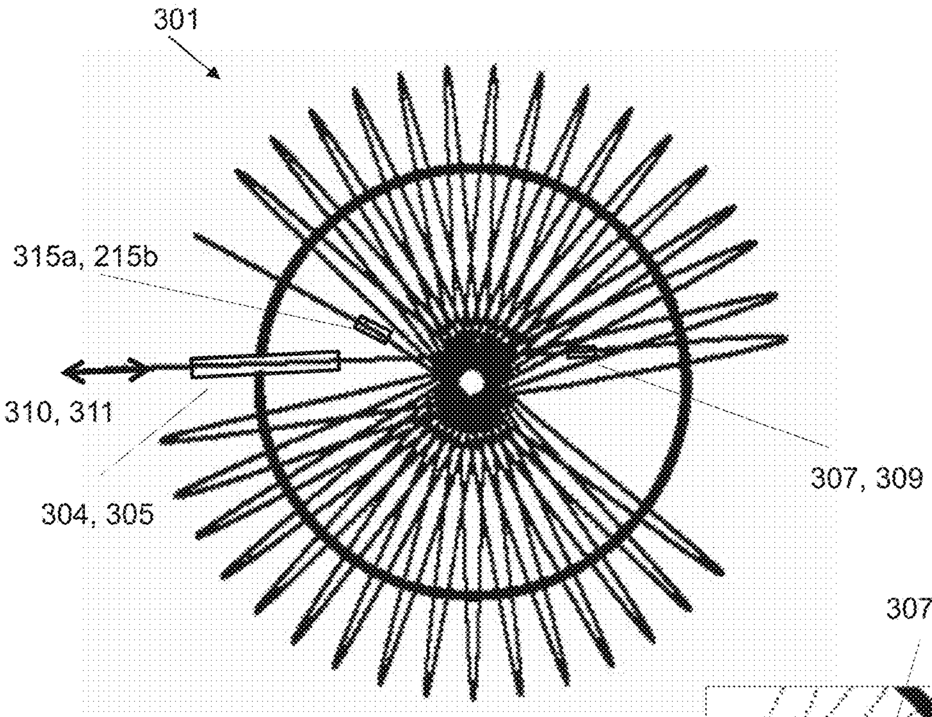
FIGS. 5A-C show another mass analyser implementing the present invention.
Figure 5B:
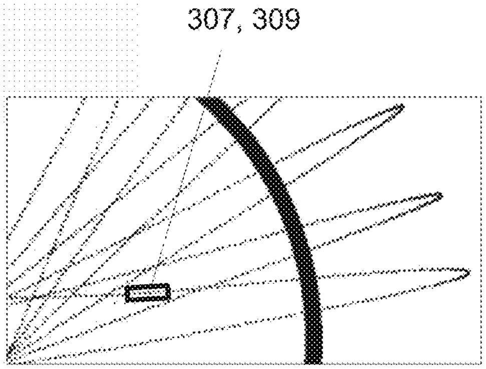
Figure 5C:
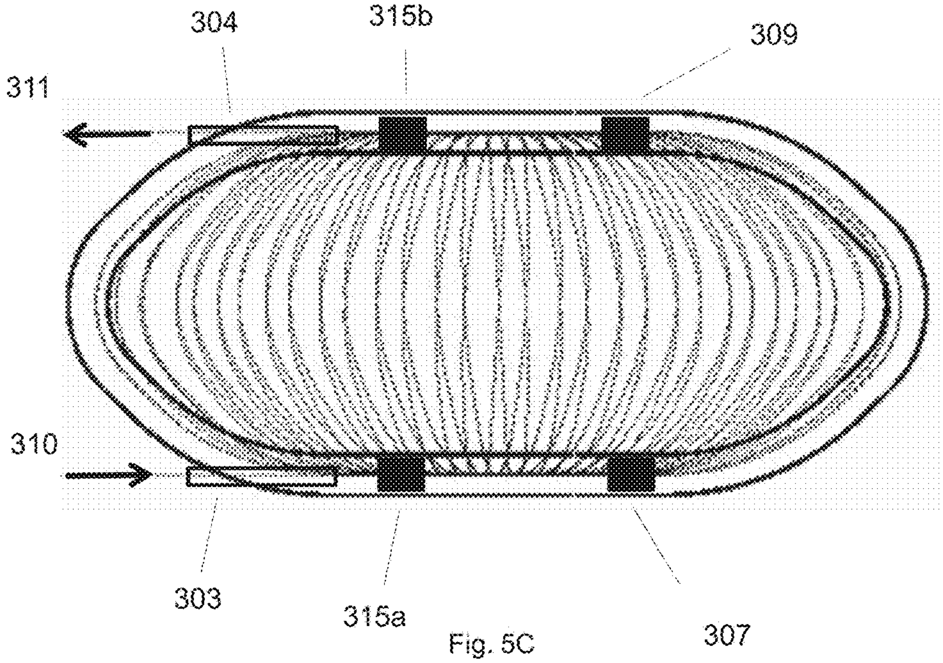

FIGS. 5A-C show another mass analyser 301 implementing the present invention.

In this example, ions are made two perform two "passes" of the instrument before extraction, and there is only one injection deflector 307, and only one extraction deflector 309.

As can be seen from FIG. 5B, in order for only one injection deflector 307 and only one extraction deflector 309 to be used, the 3D reference trajectory passes very close to the injection and extraction deflectors 307, 309. There is very little room for installation of these deflectors 307, 309 between the adjacent turns. For this reason an analyser 301 having the form shown in FIGS. 5A-C cannot be made too small. Also, there will be additional losses of ions (oscillating around the reference trajectory) on the deflectors 307, 309, and higher tolerance requirements to positioning of the deflector azimuthally will be required. These problems can be avoided by using two deflectors for injection and two deflectors for extraction (as in the embodiment shown in FIGS. 4A-B), but FIGS. 5A-C do at least show that it is possible to use only one injection deflector 307, and only one extraction deflector 309.

Figure 6A:
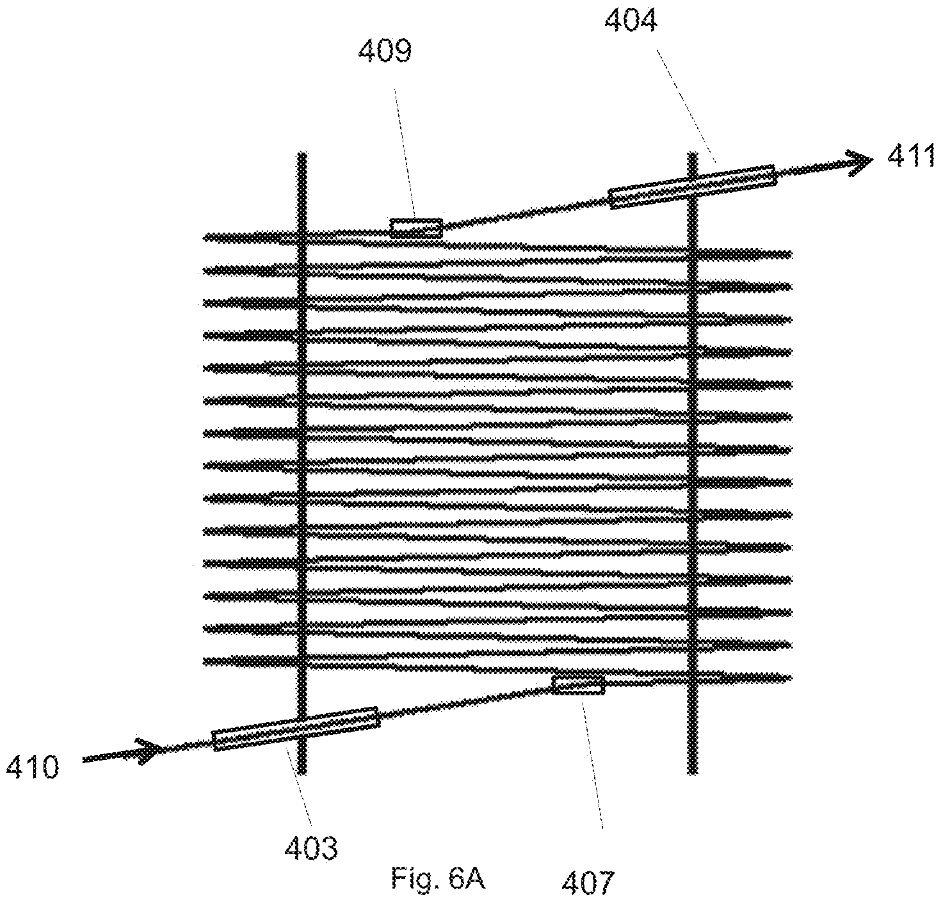
FIGS. 6A-B show another mass analyser implementing the present invention.
Figure 6B:
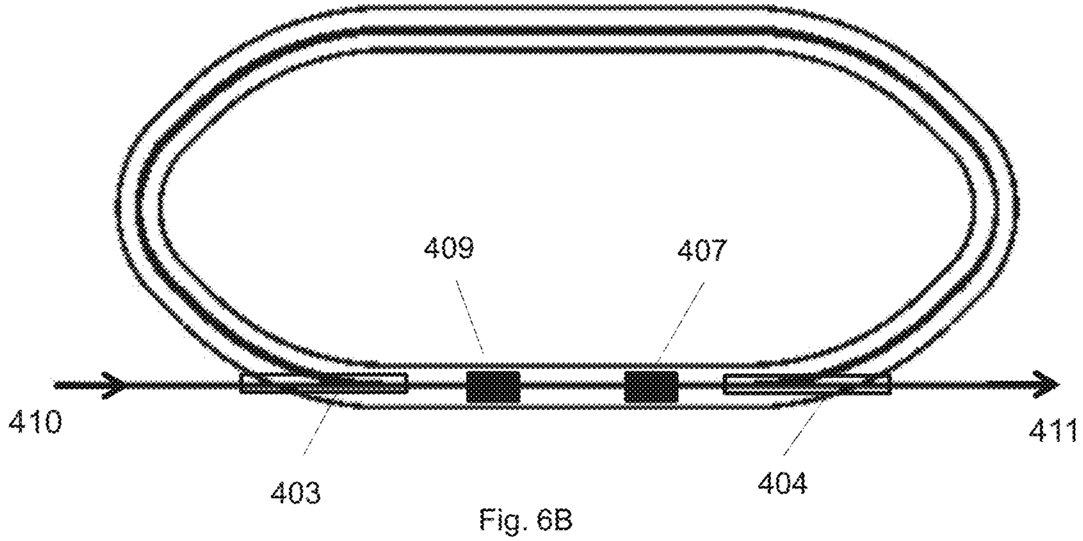

FIGS. 6A-B show another mass analyser 401 implementing the present invention.

Here, the drift path is linear, i.e. extending along a straight line, with just one injection deflector 407 located within the first half-turn after injection, and one extraction deflector 409 located within the last half-turn before extraction. No injection/extraction PCB correctors are used.

The positioning of the deflectors 407, 409 can be seen from the side view of FIG. 6B.

Figure 7:
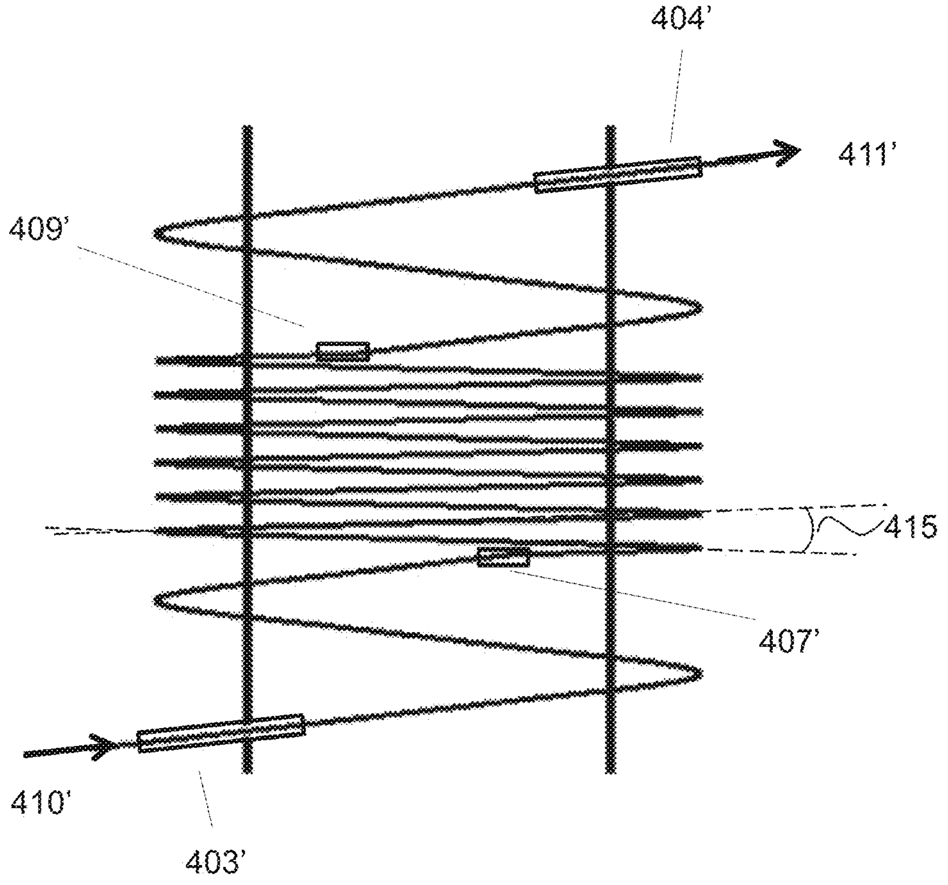
FIG. 7 shows another mass analyser implementing the present invention.

FIG. 7 shows a modified mass analyser 401' similar to that shown in FIGS. 6A-B, except that here the injection deflector 407' is located within the second turn after injection. Similarly, the extraction deflector 409' is located within the second from last turn.

Here, the injection deflector 407' is configured to increase the distance between the 3D reference trajectory and the injection opening by being mutually configured with the injection tube 403' such that the injection interface injects ions into the mass analyser with an initial trajectory such that ions are substantially unaffected by electric field distortions around the injection opening, wherein the injection deflector is configured to bring subsequent turns within the mass analyser closer together.

Figure 8A:
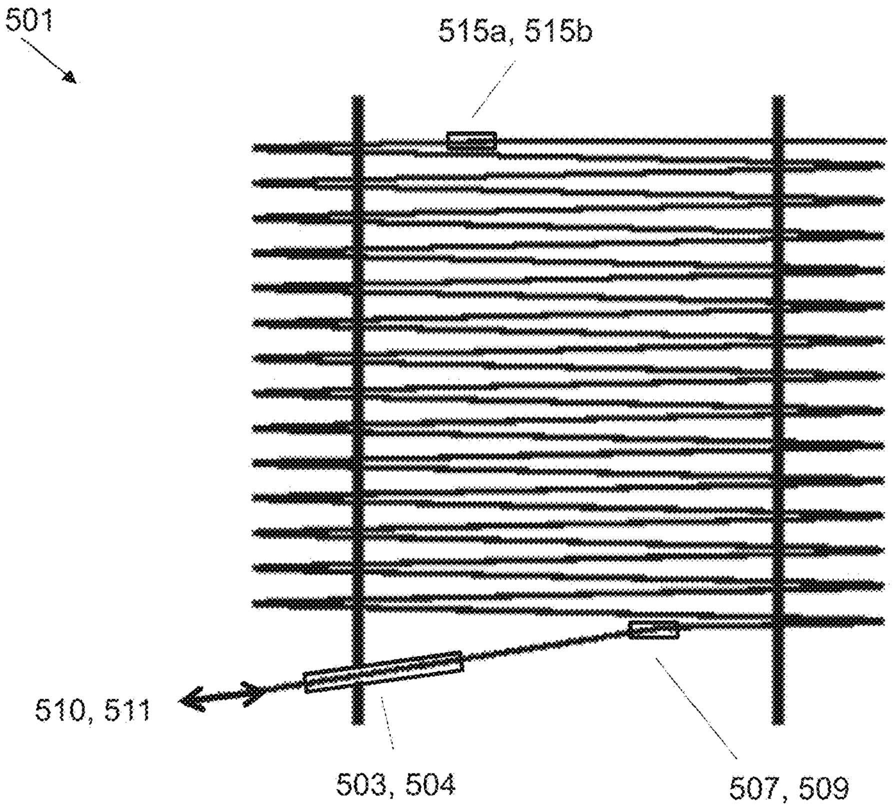
FIGS. 8A-B show another mass analyser implementing the present invention.
Figure 8B:
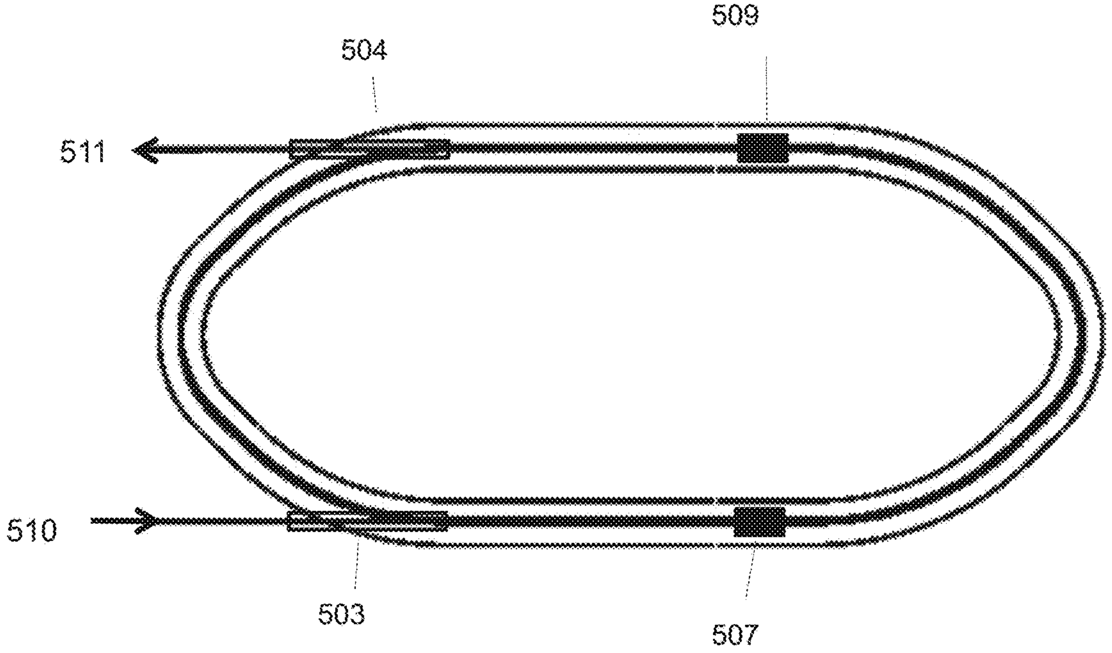

FIGS. 8A-B show another mass analyser 501 implementing the present invention.

Here, the drift path is linear, i.e. extending along a straight line, with just one injection deflector 507 located within the first half-turn after injection of ions 510 through the injection opening 503, and one extraction deflector 509 located within the last half-turn before extraction of ions 511 through the extraction opening 504. No injection/extraction PCB correctors are used.

In this example, reversing deflectors 515*a*, 515*b* (upper and lower) are used to allow ions to perform two passes of the mass analyser 501.

Figure 9:
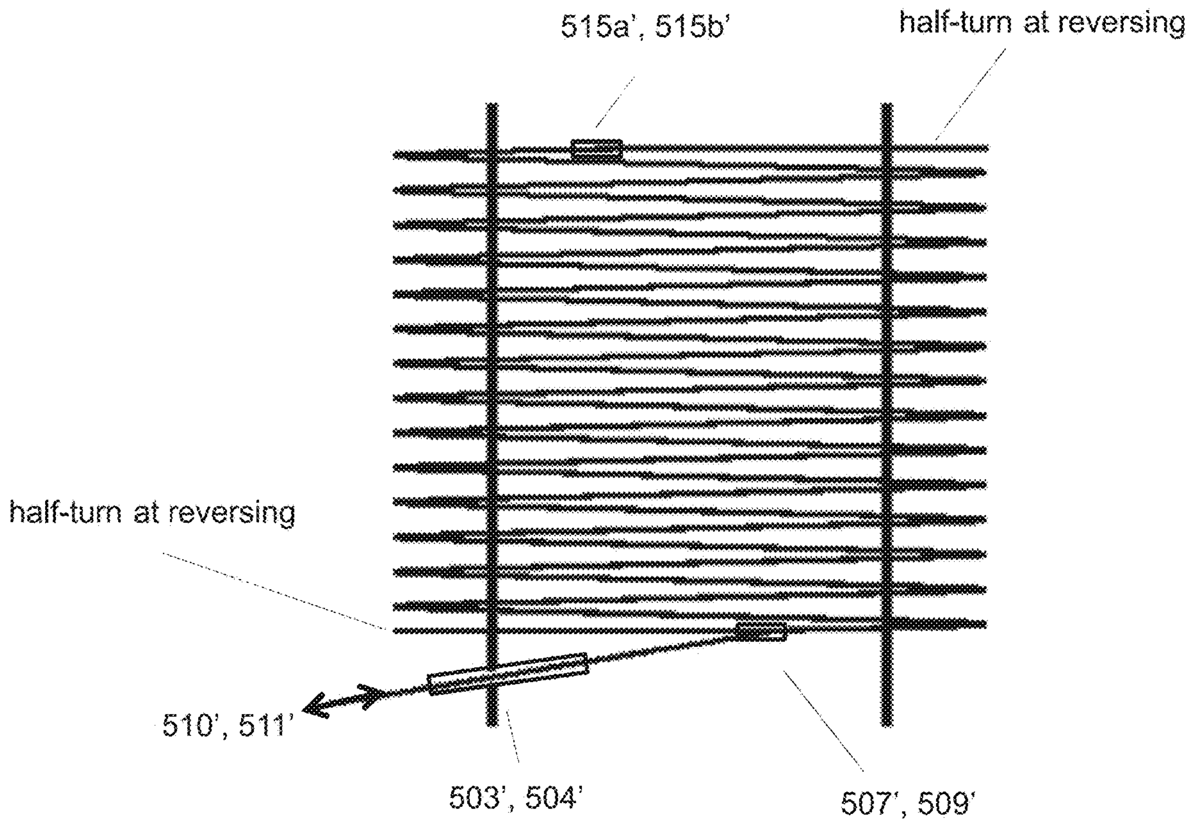
FIG. 9 shows another mass analyser implementing the present invention.

FIG. 9 shows a modified mass analyser 501' similar to that shown in FIGS. 8A-B, except that here the injection deflector 507' and extraction deflector 509' are used as a second reversing deflector set, such that ions can be made to complete more than two "passes" of the mass analyser.

Figure 10:
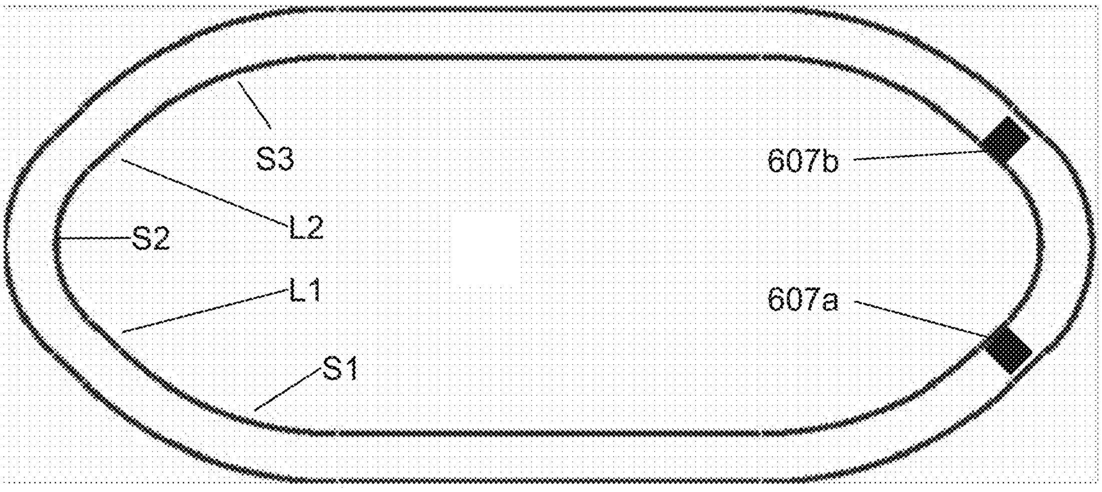
FIG. 10 shows an alternative positioning of deflectors of the injection and extraction interfaces.

FIG. 10 shows an alternative positioning of deflectors of the injection and extraction interfaces.

In the example shown in FIG. 10, deflectors 607*a*, 607*b* of the injection and extraction interfaces are positioned within focussing lens electrodes L1, L2 configured to focus ions towards the 3D reference trajectory.

Note that separation in the direction of the drift path of adjacent turns inside lenses L1, L2 is much larger than is the case at the polar regions, so deflectors embedded within focussing electrodes may be advantageous for analysers of very small size, compared with locating the deflectors in the polar regions (in which their positioning might be difficult in a small analyser).

A potential issue with locating deflectors within focussing lens electrodes is that the inventor has deduced from simulations that such deflectors need to be able to deflect ions in both the direction of the drift path and a transverse direction that is locally perpendicular to the reference trajectory and to the drift path.

Whereas the inventor has observed that positioning the deflectors in the polar regions can be implemented using only deflectors able to deflect ions in the direction of the drift path (although some additional deflection in the transverse direction might still be desirable for correcting misalignments, even if the deflectors are positioned in the polar regions). The inventor also observes that embedding deflectors in focussing lens electrodes is in general more difficult in manufacturing and assembling compared with electrodes to be located in field free regions.

FIGS. 2B and 7 have been labelled with the drift angle 115, 415 for a curved drift path example and a linear drift path example, based on the definitions already provided above (the straight lines referenced in those earlier definitions are shown here as dashed lines).

By way of comparison, in the analyser shown in FIG. 1, the drift angle (angle between adjacent turns) cannot be made too small (typically it needs to be at least 5-6°) since at small drift angles ions pass too close to the injection/extraction PCB correctors. Whereas use of injection/extraction deflectors according to the invention permits drift angle to be made smaller on the portion of the 3D reference trajectory that is after the injection deflector(s) and before the extraction deflector(s), and indeed the drift angle is preferably made as small a possible down to a minimum drift angle that depends on deflector dimensions and separation of adjacent turns at the deflector positions. Positioning inside conical focussing lens electrodes F1, F2 (as in FIG. 10 discussed below) could allow the use of 3° or even smaller drift angles resulting in respectively increased turn numbers.

Figure 11A:
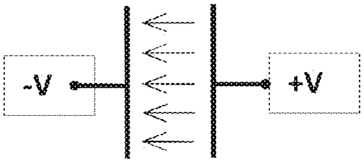
FIGS. 11A(i)-C show example parallel plate deflectors.

FIGS. 11A(i)-(iii) schematically show a parallel plate deflector for generating deflecting electric field in the drift direction by applying positive and negative potentials +V and −V to the plates.

Figure 11B:
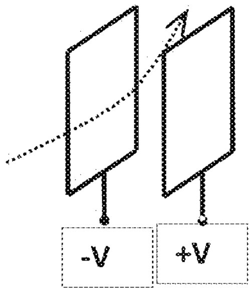
Figure 11B:
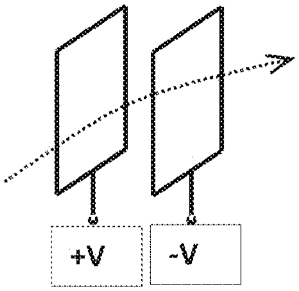
Figure 11B:
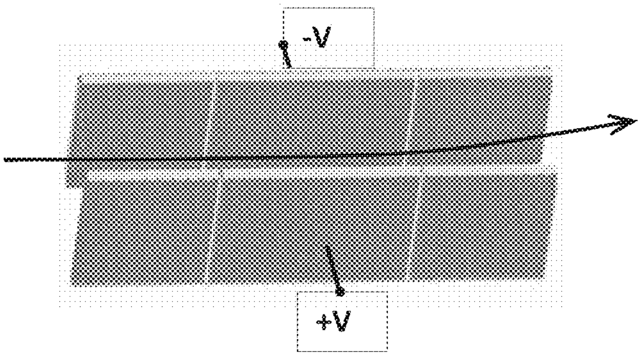

FIG. 11B shows a 3D model of another parallel plate deflector.

Figure 11C:
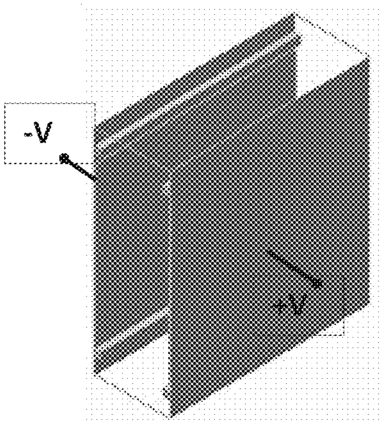

FIG. 11C shows a 3D model of another parallel plate deflector.

FIGS. 12A(i)-(ii) schematically show a combined parallel plate deflector for generating deflecting electric fields in the drift direction and in the (other) transverse direction by applying, respectively, potentials +−$V_1$ and +−$V_2$ to the plates.

FIG. 12B shows a multipole deflector (having twelve poles) for generating deflecting electric fields in the drift direction and in the (other) transverse direction by applying a number of potentials distributed over the poles.

FIGS. 12C(i)-(ii) respectively show 3D models of (i) the combined parallel plate deflector and (ii) the multipole deflector.

Figure 13A:
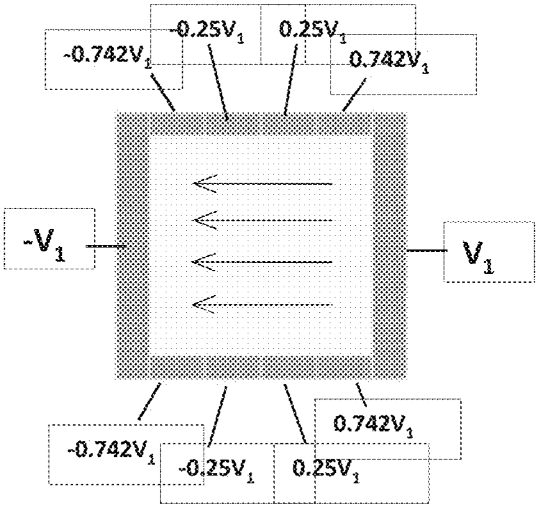
FIGS. 13A-B show an example of a deflector embedded into a conical lens electrode.
Figure 13B:
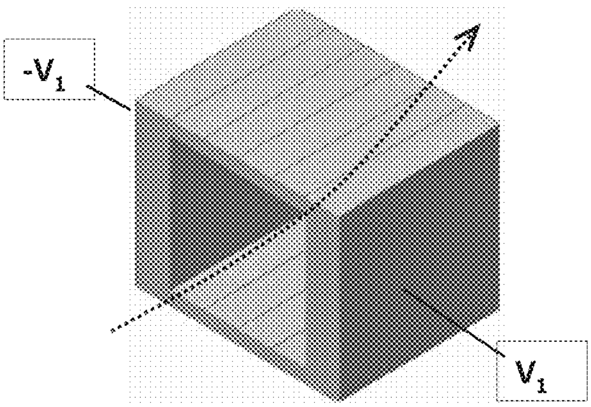

FIGS. 13A-B show an example of a deflector embedded into a conical lens electrode (e.g. as may be used in the example shown in FIG. 10) for generating electric field for deflecting ions in the drift direction. In addition to the main deflector electrodes with potentials +−$V_1$ there are auxiliary inner (lower in the figure) and outer (upper in the figure) electrodes with potentials +−0.742$V_1$ and +−0.25$V_1$ dedicated to improvement of the electric field uniformity in the (other) transverse direction.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word “comprise” and “include”, and variations such as “comprises”, “comprising”, and “including” will be understood to imply the inclusion of a stated integer or step or group of integers or steps but not the exclusion of any other integer or step or group of integers or steps.

It must be noted that, as used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by the use of the antecedent “about,” it will be understood that the particular value forms another embodiment. The term “about” in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

“A High Resolution Multi-turn TOF Mass Analyser”, V. Shchepunov et al, SHIMADZU REVIEW, Vol. 72, No. 3.4 (2015).

U.S. Pat. No. 9,082,602B2

U.S. Pat. No. 7,504,620B2

WO2011/086430A1

WO2018/033494A1

The invention claimed is:

1. A mass analyser for use in a mass spectrometer, the mass analyser having:

a set of sector electrodes spatially arranged to provide an electrostatic field in a 2D reference plane suitable for guiding ions along an orbit in the 2D reference plane, wherein the set of sector electrodes extend along a drift path that is locally orthogonal to the 2D reference plane so that, in use, the set of sector electrodes provide a 3D electrostatic field region; and an injection interface configured to inject ions into the mass analyser via an injection opening such that the ions injected into the mass analyser are guided by the 3D electrostatic field region along a 3D reference trajectory according to which ions perform multiple turns within the mass analyser whilst drifting along the drift path in a direction locally orthogonal to the 2D reference plane, wherein each turn as projected onto the 2D reference plane corresponds to a completed orbit in the 2D reference plane;

wherein the injection interface includes at least one injection deflector located within the mass analyser, the at least one injection deflector being configured to deflect ions injected into the mass analyser in the forward direction of the drift path so as to increase the distance between the 3D reference trajectory and the injection opening such that the closest distance that the 3D reference trajectory comes to the injection opening, at completion of the first turn in the mass analyser, is larger than would have been the case had the at least one injection deflector been absent so that ions guided along the 3D reference trajectory are, after injection into the mass analyser, deflected by the injection deflector to be kept adequately distant from the injection opening such that they are substantially unaffected by electric field distortions around the injection opening;

the mass analyser includes an extraction interface configured to extract ions out from the mass analyser via an extraction opening after the ions extracted out from the mass analyser have been guided by the 3D electrostatic field region along the 3D reference trajectory; and the extraction interface comprises at least one extraction deflector configured to deflect ions injected into the mass analyser in the forward direction of the drift path so as to increase the distance between the 3D reference trajectory and the extraction opening.

2. A mass analyser according to claim 1, wherein the at least one injection deflector is configured to deflect ions injected into the mass analyser in the forward direction of the drift path before those ions have completed their first half turn within the mass analyser.

3. A mass analyser according to claim 1, wherein:

the mass analyser includes an extraction interface configured to extract ions out from the mass analyser via an extraction opening after the ions extracted out from the mass analyser have been guided by the 3D electrostatic field region along the 3D reference trajectory; and the extraction deflector is configured to deflect ions injected into the mass analyser in the forward direction of the drift path so as to increase the distance between the 3D reference trajectory and the extraction opening.

4. A mass analyser according to claim 3, wherein the at least one extraction deflector is configured to deflect ions injected into the mass analyser in the forward direction of the drift path after those ions have started their last three turns within the mass analyser.

5. A mass analyser according to claim 3, wherein the at least one injection deflector is used as the at least one extraction deflector.

6. A mass analyser according to claim 1, wherein the drift path is curved around a reference axis, and the 3D reference trajectory includes at least five pairs of adjacent turns for which an angle measured using straight lines extending from the reference axis to corresponding extreme points of the adjacent turns of the 3D reference trajectory as projected in a plane perpendicular to the reference axis is 6° or less.

7. A mass analyser according to claim 1, wherein the drift path is linear, and the 3D reference trajectory includes at least five turns for which an angle measured using straight lines extending between three consecutive extreme points of the 3D reference trajectory as projected in a plane perpendicular to the 2D reference plane is 3° or less.

8. A mass analyser according to claim 1, wherein the mass analyser includes a reversing deflector set, wherein the reversing deflector set includes one or more reversing deflectors configured to reverse the forward direction in which ions drift along the drift path, so that ions drifting towards the reversing deflector set are made to drift back towards the injection interface.

9. A mass analyser according to claim 8, wherein the mass analyser includes a second reversing deflector set, wherein the second reversing deflector set includes one or more reversing deflectors configured to reverse the forward direction in which ions drift along the drift path, so that ions drifting towards the second reversing deflector set are made to drift back towards the first reversing deflector set.

10. A mass analyser according to claim 9, wherein the at least one injection deflector is configured to additionally operate as the second reversing deflector set.

11. A mass analyser according to claim 8, wherein at least one extraction deflector is configured to additionally operate as a reversing deflector set.

12. A mass analyser according to claim 9, wherein the at least one injection deflector is configured to additionally operate the at least one extraction deflector, and as the second reversing deflector set.

13. A mass analyser according to claim 1, wherein at least one above-mentioned deflector is positioned at a location along the 3D reference trajectory at which the 3D reference trajectory is not surrounded by sector electrodes.

14. A mass analyser according to claim 1, wherein the mass analyser includes one or more focussing lens electrodes configured to focus ions towards the 3D reference trajectory, wherein at least one above-mentioned deflector is located within a focussing lens electrode.

15. A mass spectrometer having:

an ion source for producing ions having different initial coordinates and velocities;

a mass analyser according to claim 1, wherein the injection interface is configured to inject ions produced by the ion source into the mass analyser via the injection opening such that the ions are guided along the 3D reference trajectory;

an ion detector for detecting ions produced by the ion source after the ions have been guided along the 3D reference trajectory.

16. A mass analyser for use in a mass spectrometer, the mass analyser having:

a set of sector electrodes spatially arranged to provide an electrostatic field in a 2D reference plane suitable for guiding ions along an orbit in the 2D reference plane, wherein the set of sector electrodes extend along a drift path that is locally orthogonal to the 2D reference plane so that, in use, the set of sector electrodes provide a 3D electrostatic field region; and an extraction interface configured to extract ions out from the mass analyser via an extraction opening after the ions extracted out from the mass analyser have been guided by the 3D electrostatic field region along a 3D reference trajectory according to which ions perform multiple turns within the mass analyser whilst drifting along the drift path in a direction locally orthogonal to the 2D reference plane, wherein each turn as projected onto the 2D reference plane corresponds to a completed orbit in the 2D reference plane;

wherein the extraction interface includes at least one extraction deflector, located within the mass analyser, the at least one extraction deflector being configured to deflect ions following the 3D reference trajectory in the direction of the drift path, wherein the extraction deflector is configured to deflect ions following the 3D reference trajectory in the forward direction of the drift path so as to increase the distance between the 3D reference trajectory and the extraction opening such that the closest distance that the 3D reference trajectory comes to the extraction opening, when starting the last turn in the mass analyser, is larger than would have been the case had the at least one extraction deflector been absent so that ions guided along the 3D reference trajectory are, before extraction out from the mass analyser, deflected by the extraction deflector to be kept adequately distant from the extraction opening such that they are substantially unaffected by electric field distortions around the extraction opening.

17. A mass spectrometer having:

an ion source for producing ions having different initial coordinates and velocities;

a mass analyser according to claim 15, wherein the mass analyser is configured to guide ions produced by the ion source along the 3D reference trajectory;

an ion detector for detecting ions produced by the ion source after the ions have travelled along the 3D reference trajectory and have been extracted from the mass analyser by the extraction interface via the extraction opening.

* * * * *